United States Patent
Dudar (10) Patent No.: US 10,489,934 B2
(45) Date of Patent: Nov. 26, 2019

(54) VEHICLE EXTERIOR CONDITIONING

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 216 days.

(21) Appl. No.: 15/606,524

(22) Filed: May 26, 2017

(65) Prior Publication Data

US 2018/0341270 A1    Nov. 29, 2018

(51) Int. Cl.
| | |
|---|---|
| G05D 1/02 | (2006.01) |
| G06T 7/90 | (2017.01) |
| B60S 1/08 | (2006.01) |
| B60S 3/00 | (2006.01) |
| G06K 9/00 | (2006.01) |
| G06T 7/00 | (2017.01) |
| G06Q 10/00 | (2012.01) |

(52) U.S. Cl.
CPC .............. G06T 7/90 (2017.01); B60S 1/0844 (2013.01); B60S 3/00 (2013.01); G06K 9/00791 (2013.01); G06T 7/001 (2013.01); G06Q 10/20 (2013.01); G06T 2207/10024 (2013.01); G06T 2207/30252 (2013.01)

(58) Field of Classification Search
None
See application file for complete search history.

(56) References Cited

U.S. PATENT DOCUMENTS

| | | |
|---|---|---|
| 8,370,030 B1 | 2/2013 | Gurin |
| 9,409,549 B2 | 8/2016 | Yopp et al. |
| 2016/0251000 A1 | 9/2016 | Loman |
| 2017/0076463 A1 | 3/2017 | Nishijima |
| 2017/0121019 A1* | 5/2017 | Shin ...................... B64C 39/024 |

FOREIGN PATENT DOCUMENTS

| | | |
|---|---|---|
| DE | 19728725 A1 | 1/1999 |
| DE | 102013001332 A1 | 7/2014 |
| DE | 102014226358 A1 | 6/2016 |
| DE | 102015007156 A1 | 12/2016 |
| GB | 2559371 A | 8/2018 |
| WO | 2018024350 A1 | 2/2018 |

OTHER PUBLICATIONS

Search Report from United Kingdom Intellectual Property Office dated Nov. 23, 2018 regarding Application No. GB1808435.0 (5 pages).

* cited by examiner

*Primary Examiner* — Richard M Camby
(74) *Attorney, Agent, or Firm* — Frank A. MacKenzie; Bejin Bieneman PLC (57) ABSTRACT

A system includes a computer programmed to receive image data of an exterior of a vehicle from an external image device. The computer is further programmed to, upon determining that a difference between the received image data and stored baseline image data exceeds a threshold, actuate the vehicle to navigate to a car wash location.

20 Claims, 4 Drawing Sheets

VEHICLE EXTERIOR CONDITIONING

BACKGROUND

Contamination of a vehicle exterior may reduce the fuel efficiency of the vehicle by increasing wind resistance of the vehicle, may interfere with the operation of various vehicle sensors, such as an outwardly directed sensor supported underneath a body panel of the vehicle, thereby leading to false error codes, may make the vehicle undesirable for a passenger such as a user of an autonomous vehicle service, etc. Often it is not possible for a vehicle to be visually inspected by a human person, and even if such an inspection is possible, it may not identify problematic contaminants. Further, vehicles lack mechanisms to detect whether a vehicle exterior is contaminated, e.g., whether the exterior has mud, road salt, etc., coating various portions of an exterior surface.

DETAILED DESCRIPTION

Introduction

Disclosed herein is a method that includes receiving image data of an exterior of a vehicle from an external image device. The method further includes, upon determining that a difference between the received image data and stored baseline image data exceeds a threshold, actuating the vehicle to navigate to a car wash location.

The external image device may be supported by one of a second vehicle, a drone, and an infrastructure device.

The method may include selecting the baseline image data based on a location of the external image device relative to the vehicle.

The method may include recognizing the location of the external image device relative to the vehicle as at least one of in front of the vehicle, behind the vehicle, and to a side of the vehicle.

The method may include transmitting an image request based on at least one of a location of the vehicle, information from a vehicle sensor indicating vehicle suspension actuation above a threshold, and information from a vehicle sensor indicating vehicle brake actuation above a threshold.

The method may include determining the difference between the received image data and stored baseline image data based on an analysis of at least one of a brightness and a color.

The method may include actuating an image device of the vehicle to capture an image of a windshield of the vehicle and actuating the vehicle to navigate to the car wash location upon identifying an arc in the captured image.

The method may include identifying the arc based on a comparison of the captured image of the windshield with stored baseline image data of the windshield.

The method may include actuating a wiper system within a threshold amount of time before capturing the image of the windshield.

The arc may be identified based on a comparison of pixels in the image of the windshield in an area above and below where the arc is expected to form.

The comparison of pixels may be based on one of a color and a brightness of the pixels.

The method may include actuating an image device of the vehicle to capture image data of an exterior of a second vehicle and transmitting the image data to the second vehicle.

Disclosed herein is a computer programmed to perform the method.

Disclosed herein is a computer readable medium storing program instructions executable by a computer processor to perform the method.

Disclosed herein is a system, including a vehicle including a computer programmed to perform the method.

Disclosed herein is a system including a computer programmed to receive image data of an exterior of a vehicle from an external image device. The computer is further programmed to, upon determining that a difference between the received image data and stored baseline image data exceeds a threshold, actuate the vehicle to navigate to a car wash location.

The external image device may be supported by one of a second vehicle, a drone, and an infrastructure device.

The computer may be programmed to select the baseline image data based on a location of the external image device relative to the vehicle.

The computer may be programmed to recognize the location of the external image device relative to the vehicle as at least one of in front of the vehicle, behind the vehicle, and to a side of the vehicle.

The computer may be programmed to transmit an image request based on at least one of a location of the vehicle, information from a vehicle sensor indicating vehicle suspension actuation above a threshold, and information from a vehicle sensor indicating vehicle brake actuation above a threshold.

The computer may be programmed to determine the difference between the received image data and stored baseline image data based on an analysis of at least one of a brightness and a color.

The computer may be programmed to actuate an image device of the vehicle to capture an image of a windshield of the vehicle and to actuate the vehicle to navigate to the car wash location upon an identification of an arc in the captured image.

The computer may be programmed to identify the arc based on a comparison of the captured image of the windshield with stored baseline image data of the windshield.

The computer may be programmed to actuate a wiper system within a threshold amount of time before capturing the image of the windshield.

The computer may be programmed to actuate an image device of the vehicle to capture image data of an exterior of a second vehicle and to transmit the image data to the second vehicle.

Figure 1:
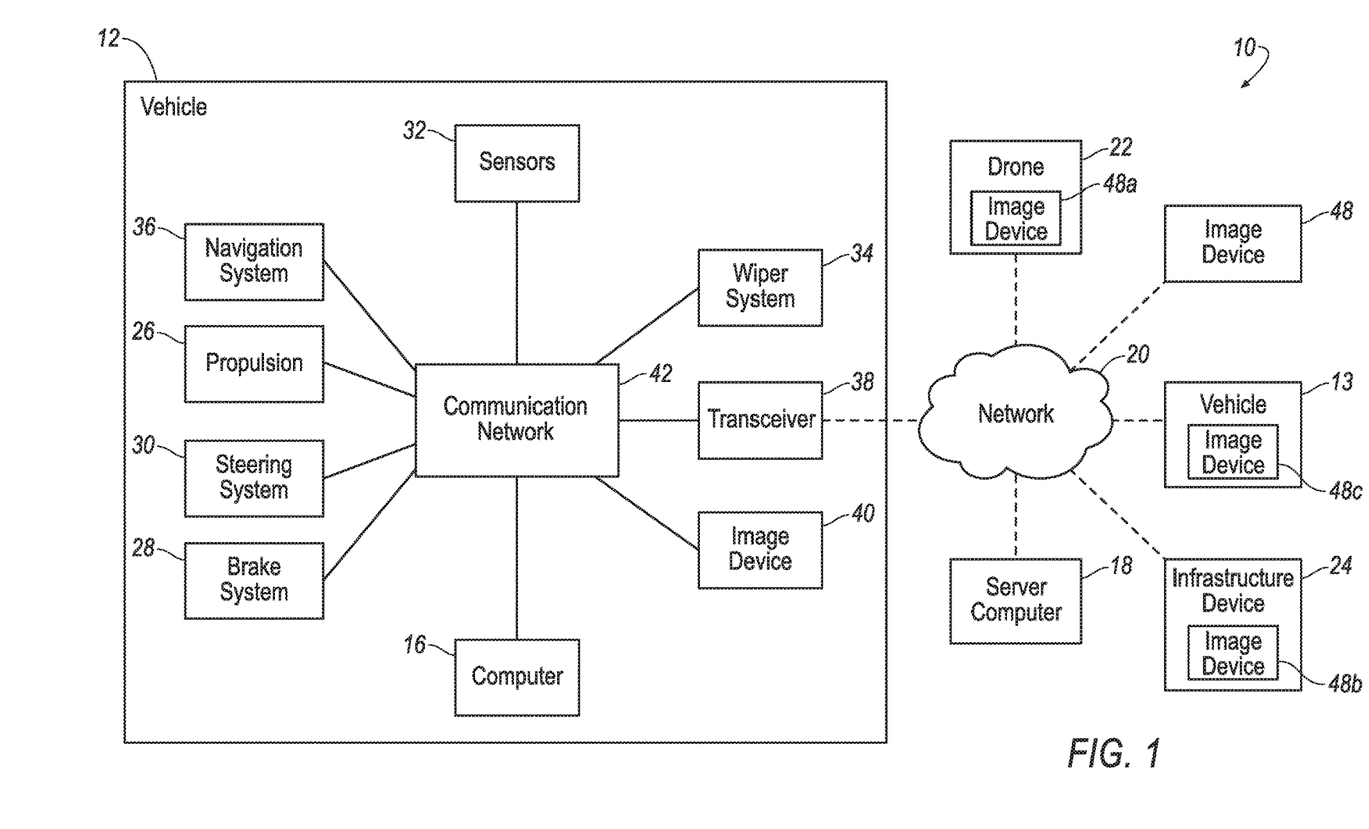
FIG. 1 is a block diagram of an example vehicle exterior conditioning system.

Referring to FIG. 1, an exterior conditioning system 10 for a vehicle 12 exterior 14 addresses the problem that the vehicle 12 is unable to detect the condition of the exterior 14 of the vehicle 12. The system 10 further provides the vehicle 12 with an ability to modify the condition of the exterior 14 based on the detected condition. Accordingly, a computer 16 is programmed to receive image data of the exterior 14 of the vehicle 12 from an external image device 48. Upon determining that a difference between the received image data and stored baseline image data exceeds a threshold (sometimes referred to herein as the "difference threshold"), e.g., based on a comparison of pixel values in the received image data and the stored baseline image data, the computer 16 actuates the vehicle 12 to navigate to a car wash location. The computer 16 may be included in, i.e., a component of, the vehicle 12. Additionally or alternatively, the computer may be remote from the vehicle 12, such as a server computer 18.

The Wide Area Network

A network 20 (sometimes referred to as a wide area network because it can include communications between devices that are geographically remote from one another, i.e., not in a same building, vehicle, etc.,) represents one or more mechanisms by which remote devices, e.g., the vehicle 12, the server computer 18, the external image device 48, etc., may communicate with each other. Accordingly, the network 20 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The External Image Device

The external image device 48, is separate and remote from the vehicle 12. The external image device 48 can include one or more of a digital (still and/or video) camera, LIDAR, infrared light detector, and/or other sensor. As is known, LIDAR is a technique for transmitting scanned light pulses, which can be from a laser, for example, and measuring the time of flight of the pulses to determine 3D range or distance to points in the surrounding real world. Further as is known, a camera can capture two-dimensional digital images comprised of pixels. Yet further, infrared sensors are known for detecting light in the infrared spectrum. In general, the external image device 48 captures conventional images in the visible light spectrum, and/or captures images outside of the visual spectrum, for example an infrared image showing detected temperatures as image data. The external image device 48 is implemented via circuits, chips, antenna, and/or other electronic components including those described herein. The external image device 48 may include a computing device having a processor and memory, implemented as described herein. The external image device 48 may be programmed to perform the processes described herein. Additionally or alternatively, the external image device 48 may be mounted to another device, e.g., an aerial drone 22 image device 48a, an infrastructure 24 image device 48b, a second vehicle 13 image device 48c, etc. Additionally or alternatively, the external image device 48 may be controlled by a computer of the other device via the network 20 or other communications mechanism. Additionally or alternatively, the external image device 48 may be controlled by the server computer 18, e.g., via the network 20.

The external image device 48 (and/or the device controlling the external image device 48) is programmed to capture an image of the vehicle 12, and to transmit such image, e.g., as image data, to the vehicle 12, the server computer 18, etc. The image of the vehicle 12 may be captured and transmitted in response to receiving an image request, as discussed below. The transmitted image may include a capture location, i.e., a location from which the image is captured. The capture location may be relative to the vehicle 12, e.g., in front, to the side, behind, etc. The capture location relative to the vehicle may be determined based on a location of the external image device 48, and a location and orientation, e.g., a compass heading direction of a vehicle 12 forward direction, of the vehicle 12, that may be included in the image request. The external image device 48 may capture and transmit image data of multiple images of the vehicle 12, e.g., multiple images from various locations relative to the vehicle 12.

The drone 22 is an unmanned aerial vehicle and includes a computing device that may include a number of circuits, chips, wiring, antenna, and/or other electronic components, including a processor and a memory, that can control various operations of the aerial drone 22, including those herein, e.g., with programming instructions stored on the memory. For instance, the aerial drone 22 may fly in accordance with control signals output to its propeller motors. The drone 22 includes a navigation device, a transceiver and an imaging device in communication with the drone 22 computer, as described herein.

The drone 22 may support, i.e., have mounted thereto, the external image device 48a. The drone 22 computer may be in communication with the external image device 48a. The drone 22 may control the external image device 48a, e.g., the drone 22 computer may transmit instructions to the external image device 48a. The drone 22 computer may be programmed to control the external image device 48a and to perform the processes herein. The drone 22 computer may receive image data from the external image device 48a. The drone 22 may transit the image data with the drone 22 transceiver.

The drone 22 may navigate to the location of the vehicle 12. To navigate to the location of the vehicle 12 the drone 22 may actuate its propellers based on the location of the vehicle 12 in the image request received by the drone 22, e.g., based on information from the drone 22 navigation device. The drone 22 may navigate to the location of the vehicle 12 in response to receiving the image request.

The external image device 48b may be mounted to (or near and communicatively coupled to) infrastructure 24 in a fixed location proximate a road, parking lot, etc., used by the vehicle 12. Example infrastructure 24 includes light poles, traffic signal support structures, bridges, parking structures, buildings, etc.

The second vehicle 13 may be implemented as described below for the vehicle 12. The second vehicle 13 may support and control the external image device 48c, e.g., via a vehicle 13 computer. The vehicle 13 computer may be programmed to control the external image device 48c and to perform the processes herein.

The Vehicle

With reference to FIGS. 1-4, the vehicle 12 may include any passenger or commercial automobile such as a car, a truck, a sport utility vehicle, a crossover vehicle, a van, a minivan, a taxi, a bus, etc. The vehicle 12 may operate in an autonomous (e.g., driverless) mode, a semi-autonomous mode, and/or a non-autonomous mode. For purposes of this disclosure, an autonomous mode is defined as one in which each of a propulsion 26, a brake system 28, and a steering system 30 of the vehicle 12 are controlled by one or more vehicle computers 16; in the semi-autonomous mode computer(s) 16 of the vehicle 12 control(s) one or two of the vehicle 12 propulsion 26, brake system 28, and steering system 30; each of these are controlled by a human operator in the non-autonomous mode. The vehicle 12 may additionally include sensors 32, a wiper system 34, a navigation system 36, a transceiver 38, an image device 40, and a communication network 42 for providing communication between the vehicle 12 components.

The propulsion 26 of the vehicle 12 translates stored energy into motion of the vehicle 12. The propulsion 26 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 26 is in communication with and receives input from the vehicle computer 16 and from a human driver. The human driver may control the propulsion 26 via an input device, e.g., an accelerator pedal and/or a gear-shift lever.

The brake system 28 can be a conventional vehicle braking subsystem that resists the motion of the vehicle 12 to thereby slow and/or stop the vehicle 12. The brake system 28 may be friction brakes such as disc brakes, drum brakes, band brakes, etc.; regenerative brakes; any other suitable type of brakes; or a combination. The brake system 28 can include an electronic control unit (ECU) or the like that actuates the brake system 28 to resist the motion of the vehicle 12, e.g., in response to a command from the vehicle computer 16 and/or from a human driver. The human driver may control the brake system 28 via an input device, e.g., a brake pedal.

The steering system 30 is typically a conventional vehicle steering subsystem and controls the turning of the wheels. The steering system 30 is in communication with and receives input from a steering wheel and/or the vehicle computer 16. The steering system 30 may be a rack-and-pinion system with electric power-assisted steering, a steer-by-wire system, as are both known in the art, or any other suitable system.

The vehicle sensors 32 may detect internal states of the vehicle 12, for example, wheel speed, wheel orientation, tire pressure, suspension travel, brake sensors, traction control sensors, and engine and transmission variables. The vehicle sensors 32 may detect the position or orientation of the vehicle 12, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The vehicle sensors 32 may detect the external world, for example, light measurement sensors, photometers, wind speed measurement sensors, radar sensors, scanning laser range finders, light detection and ranging (LIDAR) devices, and image processing sensors such as cameras.

The wiper system 34 may include wipers that can be moved to clear a windshield 44 of the vehicle 12, an actuation mechanism for moving the wipers, e.g., an electric motor and gear reduction unit, a fluid applicator including components known for delivering fluid to the surface of the windshield 44, e.g., one or more nozzles, a fluid reservoir and a fluid pump, and an electronic windshield 44 wiper controller implemented with circuits, chips, etc., for controlling the actuation mechanism and fluid pump.

The vehicle 12 navigation system 36 determines a location and orientation of the vehicle 12 according to map data, e.g., by geocoordinates and compass heading direction that can be used to determine the vehicle 12 location and orientation on a map. The map data may include roads and related data, such as a number of lanes, parking lot locations, etc. To determine the location and orientation of the vehicle 12, the vehicle 12 navigation system 36 may rely on information from a global navigation satellite system, distance data from vehicle sensors 32 attached to a drivetrain of the vehicle 12, a gyroscope, an accelerometer, a magnetometer, and/or other vehicle sensors 32. The map data may be stored locally, such as in the vehicle computer 16 memory (discussed below), in the vehicle 12 navigation system 36, etc., and/or remotely, such as in the server computer 18. Exemplary vehicle 12 navigation systems 36 include known GPS (global positioning system) navigation devices, personal navigation devices, and automotive navigation systems.

The transceiver 38 transmits and receives information wirelessly from other transceivers, enabling signals, data and other information to be exchanged with other computer and network systems. The transceiver 38 may communicate directly, i.e., with a communication that is transmitted or received without an intervening device, e.g., a repeater or other network component. The transceiver 38 may alternatively or additionally communicate indirectly, i.e., with a communication that is transmitted or received via an intervening device, e.g., components of the network 20. The transceiver 38 is implemented via antennas, circuits, chips, or other electronic components that can facilitate wireless communication. Example transceivers 38 include Wi-Fi® systems, radio transmitters and receivers, telecommunications systems, Bluetooth® systems, cellular systems and mobile satellite transceivers.

The vehicle 12 image device 40 can be implemented as described above for the external image device 48.

The vehicle 12 communication network 42 includes hardware, such as a communication bus, an antenna, circuits, chips, etc., for facilitating wired or wireless communication among the vehicle 12 components in accordance with a number of communication protocols such as the Dedicated Short Range Communication (DSRC) communication protocol, controller area network (CAN), Ethernet, WiFi, Local Interconnect Network (LIN), and/or other wired or wireless mechanisms.

The vehicle 12 computer 16 is a computing device that includes a vehicle processor and a vehicle memory.

The computer 16 processor is implemented via circuits, chips, or other electronic components and may include one or more microcontrollers, one or more field programmable gate arrays (FPGAs), one or more application specific circuits (ASICs), one or more digital signal processors (DSPs), one or more customer integrated circuits, etc. The computer 16 processor is programmed to process the data received via the communication network 42, the vehicle memory, etc. Processing the data and communications may include processing to perform the processes described herein, such as those described in process 500.

The computer 16 memory is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The computer 16 memory may store instructions for performing the processes described herein, such as the process 500, and data collected from the navigation system 36, the sensors 32, the transceiver 38, etc.

Figure 2:
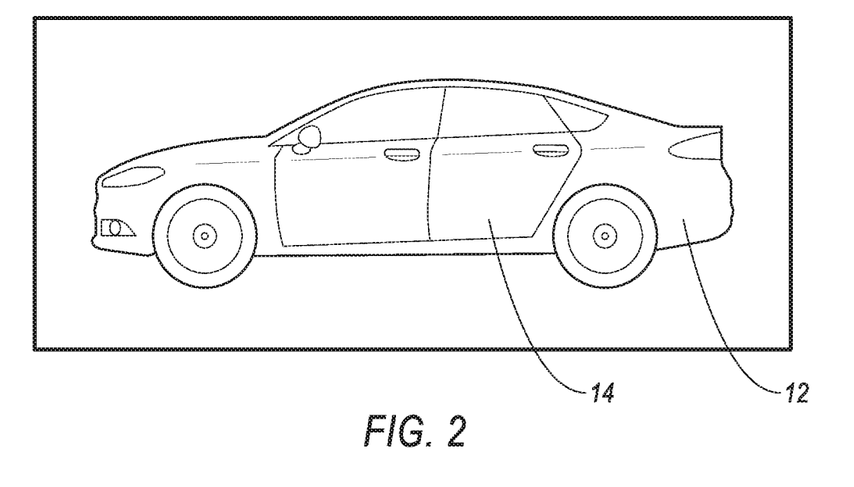
FIG. 2 is an illustration of an example baseline image of an example vehicle.

The vehicle 12 computer 16 may store image data of the vehicle 12 in a clean state or "base" state, e.g., an image of the vehicle 12 upon manufacture, taken directly after washing an exterior 14 of the vehicle 12, etc., as shown in FIG. 2. The image data of the vehicle 12 base state may include stock images, i.e., common images for all vehicles 12 of the same make, model, year, color, etc. The image data may be a pixel value representing a color for all vehicles 12 of the same make, model, year, color, etc. The image data may include a location relative to the vehicle 12 for each image, e.g. in front, to the side, behind, etc.

The vehicle 12 computer 16 may transmit the image request. As used herein, the image request is a message requesting the capture and transmission of an image of the exterior 14 of the vehicle 12, e.g., by and from the external image device 48 to the server computer 18 and/or vehicle 12. The image request may include the location and orientation of the vehicle 12, and identifying information for the vehicle 12, such as a vehicle identification number, unique name, network address, make, model and year, etc. For example, the vehicle computer 16 may send an instruction to the transceiver 38 via the communication network 42 to transmit such request. The image request may be transmitted to the external image device 48, e.g., based on identifying information for such external image device 48, e.g., from a lookup table or the like as described below. The image request may be transmitted to the server computer 18, and then to the external image device 48 from the server computer 18.

The vehicle 12 computer 16 may transmit the image request based on a location of the vehicle 12. For example, the vehicle 12 computer 16 may compare the location of the vehicle 12 with a lookup table or the like providing locations of one or more external image devices 48. Availability of an external image device 48 at a vehicle 12 location can be determined by comparing the vehicle 12 location with the image device 48 location, e.g., the imaging device 48 can be deemed available if within a predetermined distance, e.g., 50 meters, 100 meters, etc., of the vehicle location, and/or the imaging device 48 can be at a location proximate to (e.g., within a specified distance such as 25 meters, 50 meters, etc.) of the expected vehicle 12 location, e.g., based on a route being traveled, at a specified time. For example, a drone 22 on which an image device 48 is mounted may be determined to be able to travel from a home location to an expected location of the vehicle 12 at a specified time. The lookup table may include identifying information for various external image devices 48, e.g., a unique name or other unique or substantially unique identifier, IP address, etc. The lookup table may be stored in the memory of the vehicle 12 computer 16, the server computer 18, etc. The vehicle 12 computer 16 may identify the location of the vehicle 12 for comparison with the lookup table based on information received from the vehicle 12 vehicle navigation system 36.

The vehicle 12 computer 16 may transmit the image request based on information from one or more vehicle sensors 32 indicating vehicle 12 suspension actuation above a threshold, e.g., the vehicle suspension has compressed and extended at least 3 times per second for 5 seconds. Actuation of the vehicle 12 suspension above the threshold may indicate that the vehicle 12 has navigated a gravel and/or dirt road, a newly surfaced road, and/or other road type that typically changes the condition of the exterior 14 of the vehicle 12, e.g., makes the exterior 14 of the vehicle 12 dirty. The threshold for the vehicle 12 suspension actuation may be determined based on empirical testing.

The vehicle 12 computer 16 may transmit the image request based on information from one or more vehicle sensors 32 indicating vehicle 12 brake system 28 actuation above a threshold, e.g., 10 times per second, e.g., by antilock braking. Actuation of the vehicle 12 brake system 28 above the threshold may indicate that the vehicle 12 has navigated a slushy or icy road that typically changes the condition of the exterior 14 of the vehicle 12, e.g., covers the exterior 14 of the vehicle 12 with salt. The threshold for the vehicle 12 brake system 28 actuation may be determined based on empirical testing.

The vehicle 12 computer 16 may transmit the image request at set time intervals, e.g., once per week.

The vehicle 12 computer 16 may receive image data of an exterior of the vehicle 12 from the device outside the vehicle 12. For example, the vehicle 12 computer 16 may communicate with the transceiver 38 via the communication network 42 to receive such information.

The vehicle 12 computer 16 may determine that a difference between the received image data and stored baseline image data exceeds a difference threshold, e.g., based on a comparison of pixel values. Exceeding the threshold indicates that the vehicle 12 is likely dirty and could benefit from being cleaned, e.g., when the difference between the received image and the stored baseline image is caused by salt, dirt, etc., accumulating on the exterior 14 of the vehicle 12. For example, the vehicle 12 computer 16 may determine a color and/or brightness difference between the black markings on the exterior 14 of the vehicle 12 in FIG. 3, representing dirt on the vehicle 12, and the white exterior 14 of the vehicle 12 in FIG. 2, representing base image data, exceeds the difference threshold.

Figure 3:
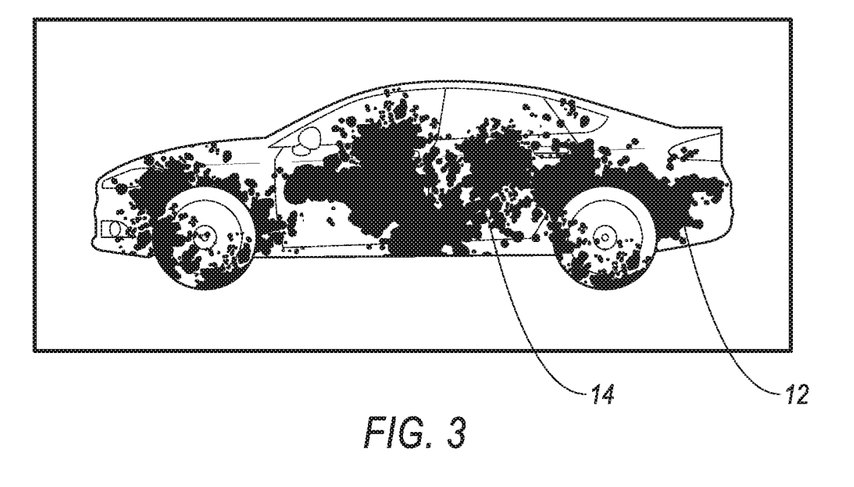
FIG. 3 is an illustration of an example image of the example vehicle captured by an external image device.

The received image data, as shown in FIG. 3, and the stored image data, as shown in FIG. 2, may be compared based on an analysis of at least one of a brightness and a color to determine the difference between the respective image data. For example, the vehicle 12 computer 16 may identify pixels in each of the image data that represents the vehicle 12 in the respective images. The pixels may be identified by identifying a profile of the vehicle 12 in each of the image, e.g., using known image recognition techniques, and then selecting pixels within the identified vehicle 12 profiles. Pixel values of the identified pixels may be compared to each other to identify one or more characteristics, e.g., color, brightness, etc., differences. The greater difference between the pixels the more likely the exterior 14 of the vehicle 12 is in an unfavorable condition, e.g., is dirty and in need of a wash.

The comparison may be performed for multiple pixels of the received image data in an area of the vehicle 12 profile identified as a colored area, e.g., a door panel, body panel, etc., and not a window of the vehicle 12. For example, a comparison of pixel values may be individually performed for each of the multiple pixels with the base image data. Individual results of each comparison may be compared to the difference threshold. Additionally or alternatively, the individual results of each comparison may be averaged together, with the average of the individual results compared to the difference threshold. The colored area of the vehicle 12 may be identified using known image recognition techniques. Multiple areas of the vehicle 12 may analyzed to determine the difference between the received image data and the stored image data.

The comparison of pixels may be performed for image data representing multiple orientations and/or areas of the vehicle 12, e.g., a comparison of pixels in a base image and a current image of side of the vehicle 12, the front of the vehicle 12, etc.

Pixels in a grayscale image have a pixel value of 0-255. For implementations in which grayscale images are compared, a difference between the pixel values of the received image data and the stored baseline image data may be compared to the threshold, e.g., 50, to determine whether the difference between the received image data and stored baseline image data exceeds the threshold.

Pixels in a color image may have pixel values for each of a red, green, and blue component of the pixel. For implementations in which color images are compared, the comparison, and difference threshold, may be of one of the individual components, e.g., the difference between the red pixel value component of the received image data and the stored baseline image data may be compared to the threshold. The comparison, and difference threshold, may be of an average of the components, e.g., the difference between the average of the pixel component values of the received image data and the stored baseline image data may be compared to a difference threshold that is determined by empirical testing. For example, color image data may be obtained for multiple vehicles 12 having an unsatisfactory exterior 14 condition, e.g., vehicles 12 reporting sensor error codes resulting from a condition of the exterior 14, vehicles 12 having increased wind resistance resulting from a condition of the exterior 14, vehicles 12 that are unappealing to an occupant resulting from a condition of the exterior 14, etc. Pixel values of the color image data of the vehicles 12 having the unsatisfactory exterior 14 condition may be compared to pixel values of the base image data. The difference in such pixel values may be used to determine the difference threshold, e.g., based on an average of the differences of such pixels, based on the difference with the lowest value, based on the average of the differences less a standard deviation from such average, etc.

Additional values associated with pixels may be used for the pixel comparison and determination of whether the difference between the stored image data and received image data exceeds the threshold. For example, known pixel values such as a human visual system (HVS) based metric, a hue, saturation, and lightness (HSL) based metric, etc., may be used.

The stored baseline image data may be the stored image data of the vehicle 12 in the base state. The vehicle 12 computer 16 may select the baseline image data based on a location of the external image device 48 relative to the vehicle 12. For example, the vehicle 12 computer 16 may recognize the image from the external image device 48 as at least one of in front of the vehicle, behind the vehicle, and to a side of the vehicle, e.g., based on such indication included in the transmitted imaged data from the external image device 48. Based on such recognition, the vehicle 12 computer 16 may select image data of the vehicle 12 in the base state showing a corresponding location of the vehicle 12 for comparison.

The received image data may be compared to a maximum brightness threshold. The maximum brightness threshold represents a brightness above which the received data is insufficient for comparison with the base image data. For example, direct sunlight on the exterior 14 of the vehicle 12 may cause the difference between the received image data and the stored image data to be above the difference threshold regardless of the condition of the exterior 14 of the vehicle 12; a pre-processing step of determining that received image data exceeds the brightness threshold and then discarding a following comparison to the difference threshold can allow avoidance of false results, e.g., incorrect reports of vehicle 12 dirtiness. The comparison of the received image data with the brightness threshold may be based on the pixel values of pixels in the received image data as described above.

Figure 4:
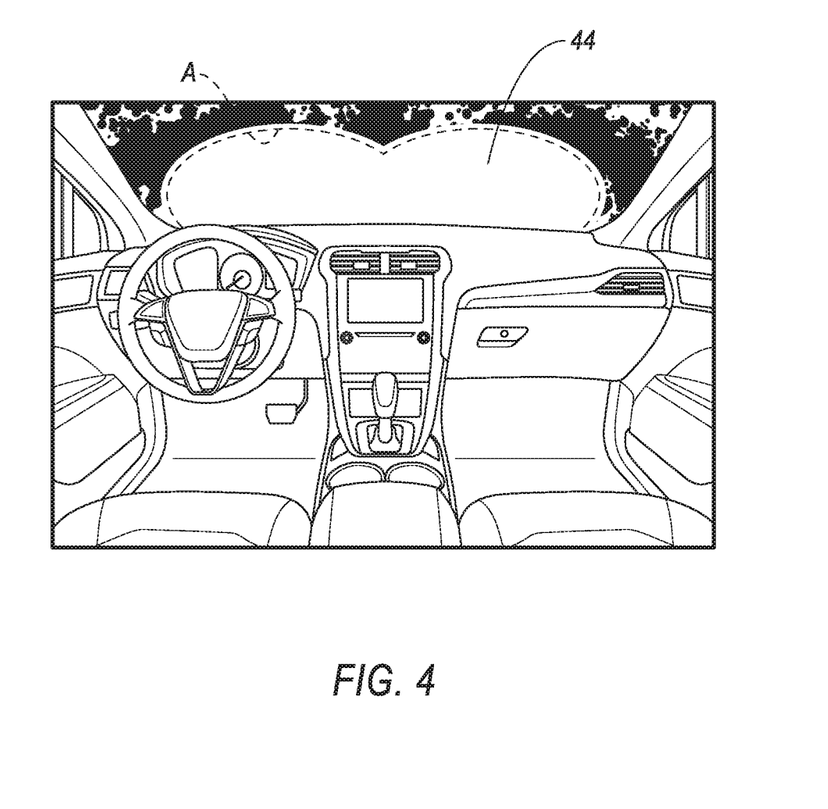
FIG. 4 is an illustration of an example image of a windshield of the example vehicle.

With reference to FIG. 4, the vehicle 12 computer 16 may actuate the image device 40 of the vehicle 12 to capture an image of the windshield 44, as shown in FIG. 4. To perform such actuation, the vehicle 12 computer 16 may instruct an image device 40 positioned to detect the windshield 44 of the vehicle 12 to capture image data of the windshield 44 and to transmit such image data to the vehicle 12 computer 16, e.g., via the communication network 42. The vehicle 12 computer 16 may actuate the image device 40 based on a location of the vehicle 12, based on information received from sensors 32 for the vehicle 12 indicating actuation of the suspension and/or braking system 38, etc. The computer 16 may capture the image of the windshield 44 and transmit such image to the server computer 18, e.g., via the network 20 and in response to receiving a request for such image from the server computer 18.

The vehicle 12 computer 16 may identify a line, e.g., a curved line or arc A, in the captured image of the windshield 44. The arc A is a pattern formed on the windshield 44 by the actuation of the wiper system 34 when the windshield 44 is dirty, e.g., an area on the windshield 44 out of reach of the wiper system 34 remains dirty, while an area of the windshield 44 wiped by the wiper system 34 is cleaned. To identify the arc A, the vehicle 12 computer 16 may compare pixels in the image of the windshield 44 in an area above and below where the arc A is expected to form. The areas on the windshield 44 where the arc A is expected to form may be identified based on 2-dimentional pixel coordinates, e.g., stored on the vehicle 12 computer 16 and determined by the manufacturer of the vehicle 12. Pixel values for pixels above and below the arc A may be analyzed to for similar characteristics, e.g., color, brightness, etc., as compared to each other. Based on the analysis, a border between the similar and dissimilar pixels can be identified and analyzed to determine if the border defines the arc A pattern.

The vehicle 12 computer 16 may identify the arc A in the image of the windshield 44 based on a comparison of the captured image data of the windshield 44 with stored baseline image data of the windshield 44. The baseline image data of the windshield 44 can be an image of a clean windshield 44, as described herein. The comparison of the images may include a subtraction analysis to identify differences in the images. The identified differences may be analyzed to determine whether the arc A exists, e.g., based on a location, density, etc., of the differences.

The vehicle 12 computer 16 may actuate the wiper system 34 by sending an actuation instruction to the wiper system 34 via the communication network 42. Actuating the wiper system 34 may include actuating the electric motor of the wiper system 34 to move the wipers. Actuating the wiper system 34 may also include actuating the fluid pump of the wiper system 34 to spray the windshield 44. The vehicle 12 computer 16 may actuate the wiper system 34 within a threshold amount of time, e.g., 3 seconds, before capturing the image of the windshield 44. The vehicle 12 computer 16 may determine to actuate the wiper system 34 based on a location of the vehicle 12, based on information received from sensors for the vehicle 12 indicating actuation of the suspension and/or braking system 37, etc., as discussed herein.

The vehicle 12 computer 16 may actuate the vehicle 12 to navigate to a car wash location, i.e., a location where the exterior 14 of the vehicle 12 can be cleaned. The carwash location may be a location associated with a device including various fluid spray devices, wiping devices etc., such as a conventional drive through carwashes. The carwash location may be a location associated with a service, e.g., a human that will clean the exterior 14 of the vehicle 12. The car wash location may be a location associated with exposure to the elements, e.g., rain fall that may clean the vehicle 12. Carwash locations may be stored in the vehicle 12 computer 16, server computer 18, etc., e.g., as part of the map data. Carwash locations may be based on weather information from the server computer 18, e.g., that rain is expected to fall at a certain time and location.

The vehicle 12 computer 16 may prioritize certain carwash locations over others to be utilized by the vehicle 12. For example, the computer 16 may store a carwash location lookup table or the like associating various carwash locations with a cost of utilizing each carwash location. Carwash locations associated with a lower cost may have higher priority than carwash locations with a higher cost. The computer 16 may identify the highest priority carwash location for use when actuating the vehicle 12 to navigate to the carwash location.

The vehicle 12 computer 16 may update the carwash location lookup table at periodic intervals, e.g., once per day, and/or may update the lookup table within a threshold amount of time, e.g., 1 minute, before actuating the vehicle 12 to navigate to the carwash location. The lookup table may be updated based on information received from the server computer 18, e.g., weather information.

The vehicle 12 computer 16 may navigate the vehicle 12 to the carwash location by sending instructions to the propulsion 26, and brake system 28, and the steering system 30, e.g., based on information from the sensors 32 and navigation system 36. The vehicle 12 computer 16 may navigate the vehicle 12 to the carwash location upon determining that the difference between the received image data and stored baseline image data exceeds the threshold, upon an identification of the arc A in the captured image of the windshield, upon receipt of an instruction from the server computer 18 navigate to the carwash, etc.

The vehicle 12 computer 16 may navigate the vehicle 12 to a covered parking location subsequent navigating to the carwash location. A covered parking location is a location where the vehicle 12 may be parked and protected from outside elements, e.g., snow accumulation, that may alter the condition of the exterior 14 of the vehicle 12. Example covered parking locations include parking locations inside parking garages and decks, under a carport, etc. Covered parking locations may be included in a lookup table or the like stored on the computer 12.

The Server Computer

The server computer 18 is a computing device that includes hardware, e.g. circuits, chips, antenna, etc., programmed to transmit, receive, and process information, to and from other computing devices such as those in the vehicle 12, the external image device 48, etc., e.g., via the network 20. The server computer 18 may be one or more computers, each generally including at least one processor and at least one memory, implemented as described herein, the memory storing instructions executable by the processor, including instructions for carrying out various process steps described herein.

The server computer 18 may store weather information. Weather information is information regarding a current and/or predicted state of the weather at a certain location at a certain time. For example, the weather information may indicate that it is raining, or has a high probably of raining, e.g. greater than 80%, within a threshold amount of time, e.g., 24 hours, at a certain GPS location.

The server computer 18 may store baseline image data, e.g., images of various vehicles 12 in a base state. The image data may include a make, model year, color, capture location relative to the vehicle 12, e.g., in front, to the side, behind, etc., for the vehicle 12 in each of such images in the image data.

The server computer 18 may determine a location and orientation of the vehicle 12. For example, the server computer 18 may receive and store location and orientation information, e.g., GPS coordinates, the compass heading direction of a forward direction of the vehicle 12, etc., received from the vehicle 12.

The server computer 18 may determine a location, e.g., GPS coordinates, of the external image device 48. Location information may be received from the various external image devices 48. Location information may be stored on the server computer 18, e.g., included in the map data.

The location and orientation of the vehicle 12 and the external image device 48 may be compared to determine a location of the external image device 48 relative to the vehicle 12.

The server computer 18 may transmit an image request as described herein. The image request may originate from the server computer 18, e.g., based on information received from the sensors 32 of the vehicle 12, etc., as described herein. The image request may be received by the server computer 18 from the vehicle 12 and relayed to the external image device 48.

The server computer 18 may determine that a difference between the image data received from the external image device 48 and the stored baseline image data exceeds a difference threshold, as described herein.

The server computer 18 may determine that the image data received from the external image device 48 exceeds a maximum brightness threshold, as described herein.

The server computer 18 may transmit a request to the vehicle 12 computer 16 requesting the capture and transmission of the image of the windshield 44, e.g., via the network 20.

The server computer 18 may actuate the vehicle 12 to navigate to a car wash location. For example, the server computer 18 can transmit an instruction to the vehicle 12, via the network 20, instructing the vehicle 12 to actuate its various vehicle 12 components to navigate the vehicle 12 to the car wash location. The server computer 18 may identify the carwash location as described herein.

The server computer 18 may actuate the vehicle 12 to navigate to a covered parking location, as described herein.

Process

Figure 5:
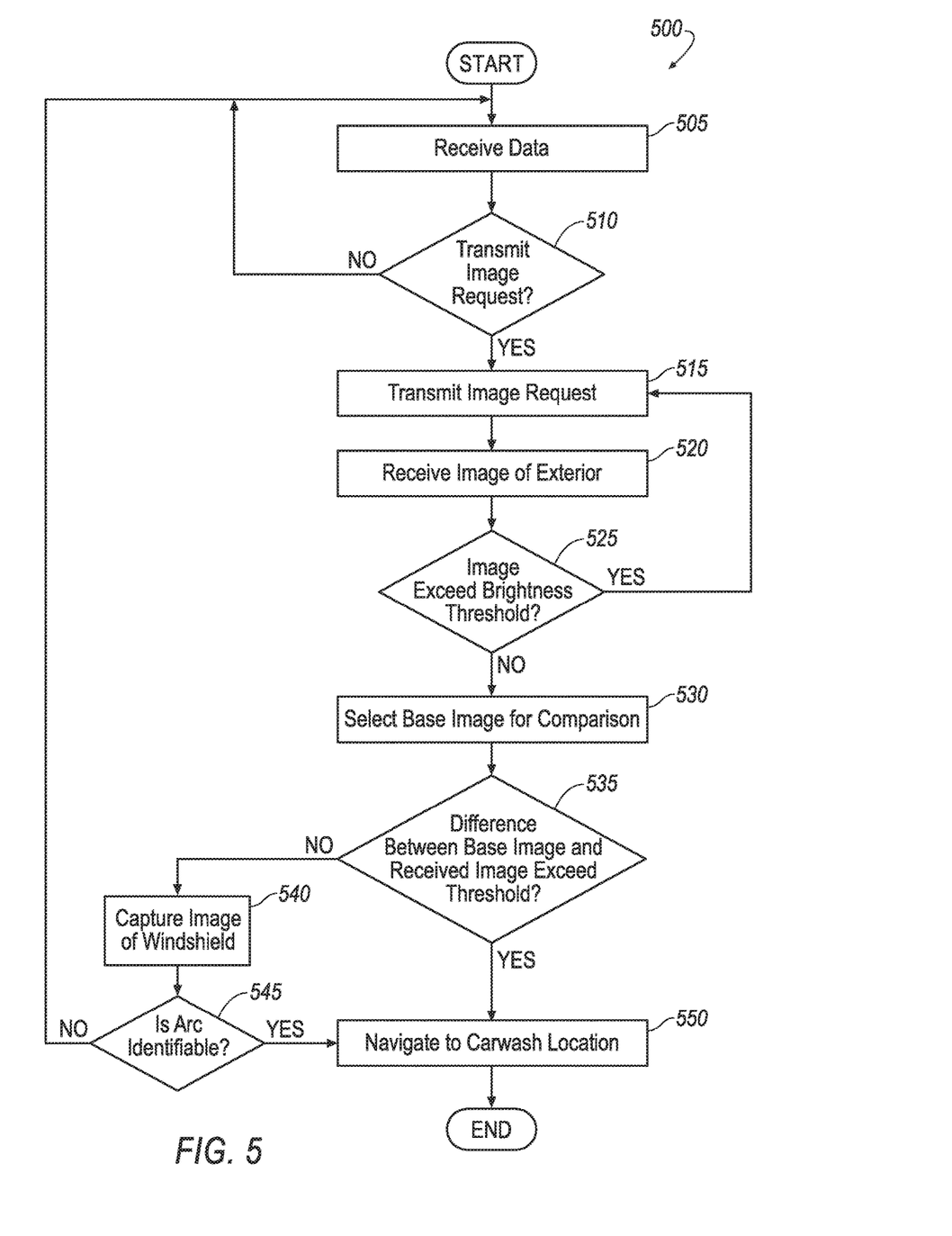
FIG. 5 is an example process of operating the example vehicle exterior conditioning system of FIG. 1.

FIG. 5 is a process flow diagram illustrating an exemplary process 500 for detecting and modifying a condition of the exterior 14 of the vehicle 12.

The process 500 begins in a block 505 in which data is received by the computer 16 from one or more of the vehicle 12 sensors 32, the navigation system 36, etc. The computer 16 may transmit the data to the server computer 18, e.g., via the network 20.

Next, at a block 510, the computer 16, or the server computer 18, determines whether an image request should be transmitted, e.g., based on the received data indicating a location of the vehicle 12, vehicle 12 suspension actuation, vehicle 12 brake system 28 actuation, etc. Upon determination that the image request should be transmitted the process 500 moves to a block 515. Upon determination that the image request should not be transmitted the process 500 returns to the block 505.

At the block 515 the vehicle 12 computer 16, and/or the server computer 18, transmits an image request, e.g., to the external image device 48, e.g., to the drone 22 external image device 48a, the infrastructure 24 external image device 48b, the vehicle 13 external image device 48c, etc. The image request may be transmitted the from the computer 16 to the server 18, and then transmitted from the server computer 18 to the external image device 48.

Next, at a block 520 the vehicle 12 computer 16, and/or the server computer 18, receives image data of the exterior 14 of the vehicle 12 from the external image device 48, e.g., via the network 20.

Next, at a block 525 the vehicle 12 computer 16, and/or the server computer 18, determines whether the received image data exceeds the maximum brightness threshold. Upon determination that the received image data does not exceed the maximum brightness threshold the process 500 moves to a block 530. Upon determination that the received image data exceeds the maximum brightness threshold the process 500 returns the block 515. Before returning to the block 515 the vehicle 12 computer 16, and/or the server computer 18, may wait a threshold amount of time, e.g., 1 hour.

At the block 530 the vehicle 12 computer 16, and/or the server computer 18, selects stored baseline image data, e.g., based on a location of the received image data relative to the vehicle 12.

Next, at a block 535 the vehicle 12 computer 16, and/or the server computer 18, determines whether a difference between the received image data and stored image data exceeds the difference threshold. Upon determination that the difference between the received image data and stored image data does not exceed the difference threshold the process 500 moves to a block 540. Upon determination that the difference between the received image data and stored image data exceeds the difference threshold the process 500 moves to a block 550.

At the block 540 the vehicle 12 computer 16, and/or the server computer 18, receives image data of the windshield 44 of the vehicle 12. For example, the vehicle 12 computer 16 may instruct the image device 40 to capture and transmit such data. Additionally, or alternatively, the server computer 18 may request the vehicle 12 computer 16 to obtain and transmit such data from the image device 40.

Next at a block 545 the vehicle 12 computer 16, and/or the server computer 18, determines whether the line, e.g., the curved line or arc A, in the captured image of the windshield 44 is identifiable. Upon determination that the line is identifiable, the process moves to the block 550. Upon determination that the line is not identifiable the process 500 returns to the block 505.

At the block 550 the vehicle 12 computer 16, and/or the server computer 18, instruct the vehicle 12 to navigate to a carwash location. After the block 550 the process 500 may end. Alternatively, the process 500 may return to the block 505.

CONCLUSION

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The adjectives "first" and "second" are used throughout this document as identifiers and are not intended to signify importance or order.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The article "a" modifying a noun should be understood as meaning one or more unless stated otherwise, or context requires otherwise. The phrase "based on" encompasses being partly or entirely based on.

What is claimed is:

1. A system comprising, a computer programmed to:
    receive image data of an exterior of a vehicle from an external image device;
    select baseline image data based on a location of the external image device relative to the vehicle; and
    upon determining that a difference between the received image data and the selected baseline image data exceeds a threshold, actuate the vehicle to navigate to a car wash location.

2. The system of claim 1, wherein the external image device is supported by one of a second vehicle, a drone, and an infrastructure device.

3. The system of claim 1, the computer further programmed to recognize the location of the external image device relative to the vehicle as at least one of in front of the vehicle, behind the vehicle, and to a side of the vehicle.

4. The system of claim 1, the computer further programmed to transmit an image request based on at least one of a location of the vehicle, information from a vehicle sensor indicating vehicle suspension actuation above a threshold, and information from a vehicle sensor indicating vehicle brake actuation above a threshold.

5. The system of claim 1, the computer further programmed to determine the difference between the received image data and stored baseline image data based on an analysis of at least one of a brightness and a color.

6. The system of claim 1, the computer further programmed to actuate an image device of the vehicle to capture an image of a windshield of the vehicle and to actuate the vehicle to navigate to the car wash location upon an identification of an arc in the captured image.

7. The system of claim 6, the computer further programmed to identify the arc based on a comparison of the captured image of the windshield with stored baseline image data of the windshield.

8. The system of claim 6, the computer further programmed to actuate a wiper system within a threshold amount of time before capturing the image of the windshield.

9. The system of claim 1, the computer further programmed to actuate an image device of the vehicle to capture image data of an exterior of a second vehicle and to transmit the image data to the second vehicle.

10. A method comprising:
    transmitting an image request based on at least one of a location of the vehicle, information from a vehicle sensor indicating vehicle suspension actuation above a threshold, and information from a vehicle sensor indicating vehicle brake actuation above a threshold;
    receiving image data of an exterior of a vehicle from an external image device; and
    upon determining that a difference between the received image data and stored baseline image data exceeds a threshold, actuating the vehicle to navigate to a car wash location.

11. The method of claim 10, wherein the external image device is supported by one of a second vehicle, a drone, and an infrastructure device.

12. The method of claim 10, further comprising selecting the baseline image data based on a location of the external image device relative to the vehicle.

13. The method of claim 12, further comprising recognizing the location of the external image device relative to the vehicle as at least one of in front of the vehicle, behind the vehicle, and to a side of the vehicle.

14. The method of claim 10, further comprising determining the difference between the received image data and stored baseline image data based on an analysis of at least one of a brightness and a color.

15. The method of claim 10, further comprising actuating an image device of the vehicle to capture an image of a windshield of the vehicle and actuating the vehicle to navigate to the car wash location upon identifying an arc in the captured image.

16. The method of claim 15, further comprising actuating a wiper system within a threshold amount of time before capturing the image of the windshield.

17. The method of claim 10, further comprising actuating an image device of the vehicle to capture image data of an exterior of a second vehicle and transmitting the image data to the second vehicle.

18. A system comprising, a computer programmed to:
    actuate an image device of a vehicle to capture an image of a windshield of the vehicle;
    identify an arc in the captured image based on one of a comparison of the captured image of the windshield with stored baseline image data of the windshield or a comparison of pixels in the captured image of the windshield in an area above and below where the arc is expected to form; and
    to actuate the vehicle to navigate to a car wash location upon identifying the arc in the captured image.

19. The system of claim 18, the computer further programmed to identify the arc based on the comparison of the captured image of the windshield with stored baseline image data of the windshield.

20. The system of claim 18, the computer further programmed to actuate a wiper system of the vehicle within a threshold amount of time before capturing the image of the windshield.

* * * * *